United States Patent

Griffin et al.

[11] 4,035,017
[45] July 12, 1977

[54] WINDOW REVEAL MOLDING

[75] Inventors: Henry W. Griffin, Birmingham; Thomas J. Nichter, Warren, both of Mich.

[73] Assignee: General Motors Corporation, Detroit, Mich.

[21] Appl. No.: 684,153

[22] Filed: May 7, 1976

[51] Int. Cl.$^2$ .............................. B60J 1/02
[52] U.S. Cl. .................................. 296/93
[58] Field of Search ............... 296/93; 49/486, 488, 49/498, 500; 52/242, 716

[56] References Cited

U.S. PATENT DOCUMENTS

| | | | |
|---|---|---|---|
| 2,772,915 | 12/1956 | Renno | 296/93 |
| 3,416,833 | 12/1968 | Griffin | 296/93 |

Primary Examiner—Philip Goodman
Attorney, Agent, or Firm—Charles E. Leahy

[57] ABSTRACT

A decorative molding for concealing the space between the edge of a window panel and an inwardly offset body panel flange structure having an inwardly extending wall and a wall extending parallel to the body panel. The decorative molding is comprised of a generally rectangular thin-wall tubular member of extruded plastic including laterally spaced inner and outer side walls and top and bottom walls. A pair of legs extend laterally from the inner side wall to form a channel adapted for engagement with the edge of the window panel. The outer side wall is generally planar for contact with the inwardly extending wall and has an end projection which spaces the bottom wall somewhat above the parallel extending wall. The bottom wall of the molding has an inverted V-shaped cross section so that the bottom wall flexes to provide a biasing force urging the outer side wall against the inwardly extending wall of the body panel flange and urging the inner side wall of the molding to capture the edge of the window panel in a channel formed by the laterally extending leg so that the width of the molding is varied to accommodate variation in the width of the space between the window panel and the flanged structure. The top wall of the molding has a width which does not substantially exceed the spacing between the edge of the window panel and the inwardly extending wall of the body panel flange to provide a narrow decorative appearance and also facilitate bending of the molding around the corners of the window panel.

3 Claims, 4 Drawing Figures

U.S. Patent  July 12, 1977  4,035,017
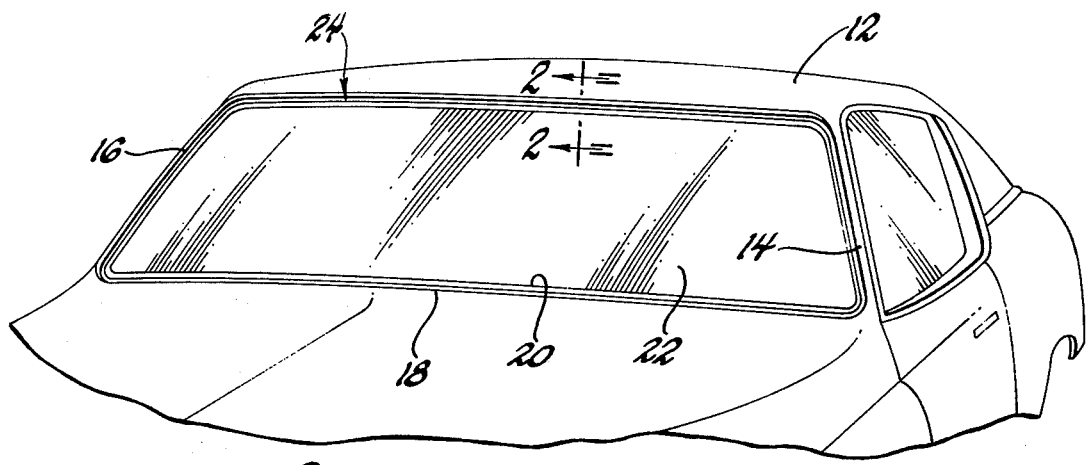
Fig.1
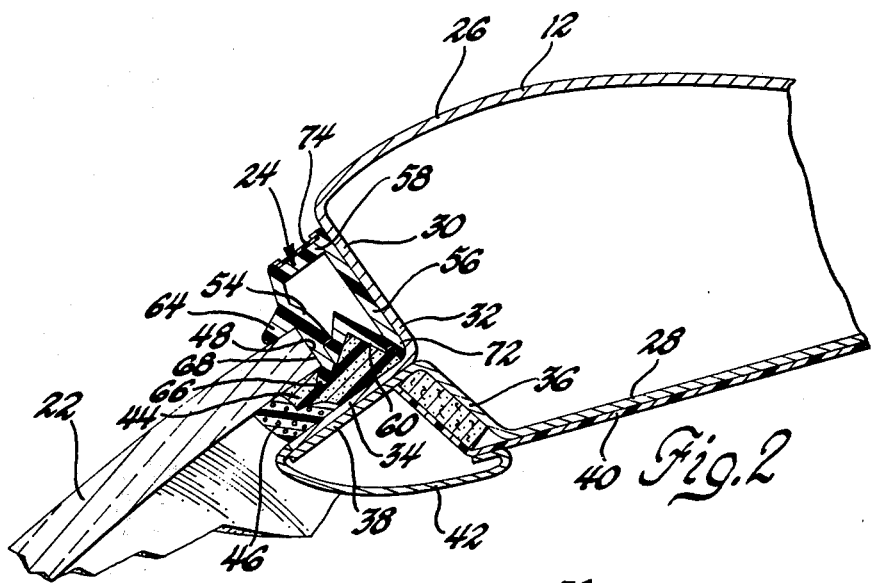
Fig.2
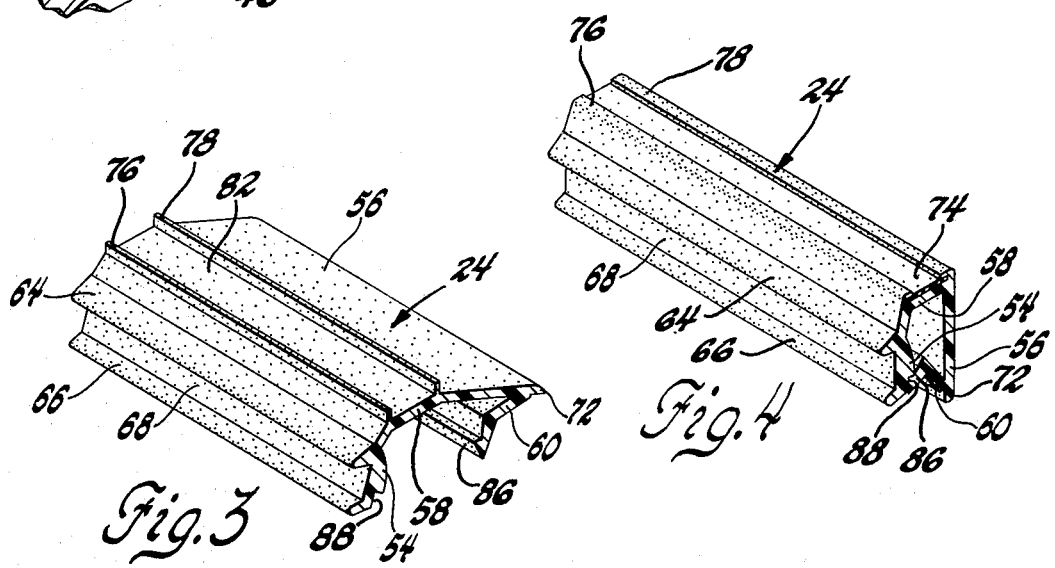
Fig.3
Fig.4

WINDOW REVEAL MOLDING

The invention relates to a window molding for a motor vehicle body and more particularly to a decorative molding for concealing a space between a fixed window panel and a vehicle body panel.

It is known to conceal the space between a window panel and a vehicle body panel by use of a metal molding which bridges the space and is attached to the vehicle body by a plurality of clips spaced along the length of the molding and adapted to engage studs which are welded along the vehicle body panel.

It is also known to provide a plastic extruded molding having a relatively wide decorative portion which overlaps the window panel and the body panel and has continuously extruded legs which are inserted into the bead of curable adhesive to attach the molding to the body panel. This overlap of the molding makes the molding effective to conceal the space irrespective of variations in the width of the space which commonly result from varying placement of the window panel in the window opening or variations in the dimension of the window panel or the window opening. A disadvantage of the prior art extruded plastic molding is that the substantial width of such moldings for overlapping the window panel and the body panel limits the ability of the molding to be bent to negotiate small radius turns which are found at the corners of the windows. Accordingly it has been common practice to mold separate corner moldings which are preformed to the proper curvature to fit the corners of the window panel.

This invention features a plastic molding strip which is adhesively secured to the vehicle body and has a thin-wall tubular configuration which facilitates bending of the molding around the corners of the window.

A further feature of the invention is that the decorative portion of the molding has a width which does not exceed the typical spacing between the edge of the window panel and the body panel flange to thereby facilitate bending of the molding around the corners of the window.

A still further feature of the invention is the provision of a plastic molding having a narrow configuration with a pair of legs extending laterally therefrom to define a channel for capturing the edge of the window panel.

Another feature of the invention is the provision of a generally rectangular thin wall tubular plastic molding strip having an inverted V-shaped bottom wall which flexes and biases inner and outer walls respectively against the window panel and the body panel flange to accommodate dimensional variation in the width of the space between the window panel and the body panel flange.

The molding of this invention is used in combination with a motor vehicle body having a window opening defined by an inwardly offset body panel flange structure formed by an inwardly extending wall and a wall extending parallel to the body panel. A window panel for closing the window opening leaves a space between the edge of the window panel and the inwardly extending wall. A bead of curable adhesive acts between the window panel and the parallel extending wall to mount the window panel on the body panel flange.

The decorative molding for concealing the space between the edge of the window panel and the inwardly extending wall is comprised of a generally rectangular thin-wall tubular member of extruded plastic including laterally spaced inner and outer side walls and top and bottom walls. A pair of legs extend laterally from the inner side wall to form a channel adapted for engagement with the edge of the window panel. The outer side wall is generally planar for contact with the inwardly extending wall. The outer side wall has an end projection which engages the parallel extending wall to locate molding relative the body panel flange and space the bottom wall somewhat from the parallel extending wall. The bottom wall of the molding extends between the inner side wall and outer side wall and has an inverted V-shaped cross section so that the bottom wall flexes to provide a biasing force urging the outer side wall against the inwardly extending wall of the body panel flange and urging the inner side wall of the molding to capture the edge of the window panel in the channel formed by the laterally extending legs. The top wall of the molding has a width which does not exceed the spacing between the edge of the window panel and the inwardly extending wall of the body panel flange. This narrow configuration of the molding provides a narrow decorative appearance and also facilitates bending of the molding around the corners of the window panel. The inverted V-shaped cross section of the bottom wall receives the bead of curable adhesive to enhance embedment of the molding in the bead of curable adhesive.

Referring to the drawings,

FIG. 1 is a partial front perspective view of a vehicle body having a window molding in accordance with the invention;

FIG. 2 is a cross sectional view taken in the direction of arrows 2—2 of FIG. 1;

FIG. 3 shows the configuration of the molding as it is extruded; and

FIG. 4 is a perspective view showing the finished molding.

Referring to the drawings, a vehicle body 10 includes a conventional roof structure 12, roof pillars 14 and 16, and a cowl structure 18 which cooperate to define a conventional window opening 20 which is closed by a fixed window panel or windshield glass 22. Referring to FIG. 2, it will be seen that the roof structure 12 includes an outer panel 26 and an inner panel 28. The outer panel 26 includes an inwardly offset flange structure 30 including an inwardly extending wall 32 which is perpendicular to the surface of the outer panel 26 and a parallel extending wall 34 which extends generally forwardly and parallel to the window panel 22 and the surface of the outer panel 26. The roof inner panel 28 has similar walls 36 and 38. The walls 36 and 38 are abutting and are pinch welded together. A fabric headlining 40 is attached to the roof inner panel 28 and has its attached edge concealed by a garnish molding 42.

The roof pillars 14 and 16 and the cowl structure 18 each have conventional inwardly offset flanges similar to those of the roof structure 12 and cooperate therewith to provide the flanged window opening 20. The window panel 22 is mounted in the window opening 20 by a bead 44 of curable adhesive material which is applied along the perimeter of the window panel 22 or in the alternative along the flange of window opening 20 so that it forms a bond between the window panel 22 and flange structure 30 when the window panel is installed in the window opening. A rubber dam 46 is interposed between the window panel 22 and parallel extending wall 34 to confine the bead of curable adhesive 44.

The curable adhesive material is preferably a polysulfide based material having suitable fillers and solvents added thereto. When cured, this material exhibits the properties of rubber in that it is capable of accepting shear stress, will not crack or corrode in various climates, and will wet both glass and painted metal to assure a continuous bond between the body flange and the window panel. When the window panel 22 is located centrally in the flanged window opening 20, a space remains between the edge portion 48 of the window panel 22 and the inwardly extending wall 32 of the flanged structure 30. The bead of curable adhesive 44 flows into this space when the window panel 22 is pushed against the parallel extending wall 34 of flange structure 30.

As best seen in FIGS. 2 and 4, the molding 24 is a thin-wall tubular member having a generally rectangular cross section. The molding 24 has an inner side wall 54 and an outer wall 56 which are laterally spaced from one another by a top wall 58 and a bottom wall 60. A pair of legs 64 and 66 extend laterally from the inner side wall 54 to form a channel or recess 68 adapted for capturing the edge portion 48. The outer side wall 56 is generally planar for substantial surface contact with the inwardly extending wall 32 of the flange structure 20. The outer side wall 56 has a projecting end 72 which engages the inwardly extending wall 32 of flange structure 30 to locate the molding 24 relative the flange structure and space the bottom wall 60 somewhat above the parallel extending wall 34. The bottom wall 60 of the molding 24 has an inverted V-shape cross section so that the bottom wall 60 flexes and provides a biasing force urging the outer side wall 56 against the inwardly extending wall 32 and urging the inner side wall 54 to capture the edge portion 48 of the window panel 22 in the recess 68 formed by the laterally extending legs 64 and 66. The inverted V-shape cross section of the bottom wall 60 also receives the bead of curable adhesive 44 to enhance embedment and adhesive retention of the molding 24 by the bead curable adhesive 44.

The molding 24 has a strip of bright mylar 74 mounted on the top wall 58 thereof to provide a chrome visual effect. As best seen in FIG. 3, the molding 24 is extruded in an open shape with a pair of spaced ribs 76 and 78 projecting from the top wall 58. The strip of bright mylar 74 is inserted into the channel 82 defined by the spaced ribs 76 and 78 and the molding 24 is then fed through a set of dies or rollers which support the underside of the top wall 58 while folding the spaced ribs 76 and 78 over the strip of bright mylar 74 to mount the strip of bright mylar 74 on the molding 24. Subsequent to this forming of the spaced ribs 76 and 78 over the strip of bright mylar 74, the extruded molding is brought to the hollow tubular configuration of FIG. 4 and the edge portion 86 of bottom wall 60 is permanently heat sealed and fused into a mating groove 88 which is provided in the lower portion of the inner side wall 54.

As best seen in FIG. 2, the width of the molding 24 exceeds the spacing between the window panel edge portion 48 and the inwardly extending wall 32 of the inwardly offset flange structure 30 only to the extent necessary to provide laterally extending legs 64 and 66 to define the channel 68. This narrow width of the molding 24 renders it adaptable for bending around relatively tight corners, for example, where the window panel 22 fits into the corner at the juncture of the roof structure 12 and the roof pillar 14. Furthermore, this narrow width of the molding provides an appearance which aesthetically distinguishes the molding from the previously known plastic reveal moldings.

Thus, the invention provides a window molding of a generally rectangular, thin-wall tubular configuration having a narrow width to facilitate bending around corners and a collapsible bottom wall for accommodating the width of the molding to the width existing between the edge of the window panel and the body panel flange defining the window opening.

The embodiments of the invention in which an exclusive property or privilege is claimed are defined as follows:

1. A decorative molding for use in a motor vehicle body having a window opening defined by an inwardly offset body panel flange structure formed by an inwardly extending wall and a wall extending parallel to the body panel, a window panel closing the window opening and when mounted therein defining a space between the edge of the window panel and the inwardly extending wall, and a bead of curable adhesive interposed between the window panel and the parallel extending wall to mount the window panel on the body panel flange, said decorative molding concealing the space between the edge of the window panel and the inwardly extending wall and comprising: a thin-wall extruded plastic tubular member of generally rectangular cross-section having laterally spaced inner and outer side walls and a top and bottom wall, a channel recess formed in the inner side wall for receiving the edge of the window panel, the outer side wall being generally planar for surface contact with the inwardly extending wall, the bottom wall of the molding being embedded in the bead of curable adhesive so that the molding is adhesively retained on the parallel extending wall of the body panel flange, the top wall of the molding having a width not substantially exceeding the space between the edge of the window panel and the inwardly extending wall to provide a narrow decorative appearance and to facilitate bending of the molding around corners of relatively small radius.

2. In a motor vehicle body having a window opening defined by an inwardly offset body panel flange structure formed by an inwardly extending wall and a wall extending parallel to the body panel, a window panel for closing the window opening and when mounted therein defining a space between the edge of the window panel and the laterally extending wall, and a bead of curable adhesive acting between the window and the parallel extending wall to mount the window panel on the body panel flange, a decorative molding for concealing the space between the edge of the window panel and the inwardly extending wall comprising: a thin-wall tubular member of extruded plastic and generally rectangular cross section having laterally spaced inner and outer side walls and top and bottom walls, a pair of legs extending laterally from the inner side wall to form a channel adapted for capturing engagement with the edge of the window panel, the outer side wall being generally planar for contact with the inwardly extending wall, the outer side wall having an end projection for engaging the parallel extending wall to locate the molding relative the body panel flange and space the bottom wall from the parallel extending wall, the bottom wall of the molding extending between the inner side wall and outer side wall and having an inverted V-shaped cross section so that the bottom wall flexes to accommodate varying width of the space between the edge of the window panel and the inwardly extending wall and provide a biasing force urging the outer side wall against the inwardly extending wall of the body panel flange and urging the inner side wall of the molding to capture the edge of the window panel in the channel formed by the laterally extending legs so that the molding fills the space between the edge of the window panel and the inwardly extending wall, the bottom wall of the molding receiving the bead of curable adhesive into the inverted V-shape so that the molding is adhesively retained on the parallel extending wall of the vehicle body flange.

3. In a motor vehicle body having a window opening defined by an inwardly offset body panel flange structure formed by an inwardly extending wall and a wall extending parallel to the body panel, a window panel for closing the window opening and when mounted therein defining a space between the edge of the window panel and the laterally extending wall, and a bead of curable adhesive acting between the window and the parallel extending wall to mount the window panel on the body panel flange, a decorative molding for concealing the space between the edge of the window panel and the inwardly extending wall comprising: a thin-wall tubular member of extruded plastic and generally rectangular cross section having laterally spaced inner and outer side walls and top and bottom walls, a pair of legs extending laterally from the inner side wall to form a channel adapted for capturing engagement with the edge of the window panel, the outer side wall being generally planar for contact with the inwardly extending wall, the outer side wall having an end projection for engaging the parallel extending wall to locate the molding relative the body panel flange and space the bottom wall from the parallel extending wall, the bottom wall of the molding extending between the inner side wall and outer side wall and having an inverted V-shaped cross section so that the bottom wall flexes to provide a biasing force forcibly urging the outer side wall against the inwardly extending wall of the body panel flange and urging the inner side wall of the molding to capture the edge of the window panel in the channel formed by the laterally extending legs so that the molding fills the space between the edge of the window panel and the inwardly extending wall, the top wall of the molding having a width approximately equal to the distance between the edge of the window panel and the laterally extending wall to provide a narrow decorative appearance and facilitate bending of the molding around corners, the bottom wall of the molding receiving the bead of curable adhesive into the inverted V-shape so that the molding is adhesively retained on the parallel extending wall of the vehicle body flange.

* * * * *